(12) United States Patent
Anantharaman et al.

(10) Patent No.: US 11,258,947 B2
(45) Date of Patent: *Feb. 22, 2022

(54) METHODS AND APPARATUS FOR MULTI-LANE MAPPING, LINK TRAINING AND LOWER POWER MODES FOR A HIGH SPEED BUS INTERFACE

(71) Applicant: Apple Inc., Cupertino, CA (US)

(72) Inventors: Sreeraman Anantharaman, Cupertino, CA (US); Hyuck-Jae Lee, Cupertino, CA (US); Vincent Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/730,859

(22) Filed: Dec. 30, 2019

(65) Prior Publication Data

US 2020/0213516 A1 Jul. 2, 2020

Related U.S. Application Data

(63) Continuation of application No. 15/620,595, filed on Jun. 12, 2017, now Pat. No. 10,523,867.

(Continued)

(51) Int. Cl.
*H04N 5/232* (2006.01)
*G06F 3/14* (2006.01)
(Continued)

(52) U.S. Cl.
CPC ..... *H04N 5/232411* (2018.08); *G06F 3/1415* (2013.01); *H04L 69/324* (2013.01);
(Continued)

(58) Field of Classification Search
CPC ............. G06F 13/12; H04N 5/63; H04N 5/14
See application file for complete search history.

(56) References Cited

U.S. PATENT DOCUMENTS 5,659,542 A 8/1997 Bell et al.
5,850,395 A 12/1998 Hauser et al.
(Continued)

FOREIGN PATENT DOCUMENTS

EP 3013008 A1 4/2016
JP 2013246642 A 12/2013
WO WO-2008070138 A2 6/2008

OTHER PUBLICATIONS

ECN L1 PM Substates with CLKREQ approved Aug. 23, 2012.
International Search Report and Written Opinion for Application No. PCT/US2012/056412, dated Feb. 15, 2013, 11 pages.
(Continued)

*Primary Examiner* — Getente A Yimer
(74) *Attorney, Agent, or Firm* — Sterne, Kessler, Goldstein & Fox P.L.L.C.

(57) ABSTRACT

Methods and apparatus for link training and low power operation. A multi-lane high speed bus is optimized for transferring audio/visual (A/V) data at slower rates. In one embodiment, the high speed bus is configured to use a packet format structure that allows for more fluid data delivery times, thereby allowing the high speed bus to deliver A/V data at times selected to reduce power consumption. In another embodiment, the high speed bus is configured to cache link initialization data for subsequent link re-initialization before entering a low power state. Thereafter, when the link exits the low power state, the high speed bus can skip certain portions of link initialization. Still a third embodiment of the present disclosure is directed to exemplary modifications to existing high speed bus link training and low power operation, consistent with the aforementioned principles. Variants of a Universal Serial Bus implementation are provided for illustration.

20 Claims, 7 Drawing Sheets

Related U.S. Application Data

(60) Provisional application No. 62/348,749, filed on Jun. 10, 2016.

(51) Int. Cl.
*H04L 29/08* (2006.01)
*H04N 7/01* (2006.01)
*H04N 5/225* (2006.01)
*H04N 7/10* (2006.01)
*H04L 69/324* (2022.01)

(52) U.S. Cl.
CPC ....... *H04N 5/2258* (2013.01); *H04N 5/23203* (2013.01); *H04N 7/0127* (2013.01); *H04N 7/10* (2013.01); *G09G 2320/0693* (2013.01); *G09G 2330/021* (2013.01); *G09G 2370/10* (2013.01)

(56) References Cited

U.S. PATENT DOCUMENTS

| | | | |
|---|---|---|---|
| 5,943,507 A | 8/1999 | Cornish et al. | |
| 6,359,863 B1 | 3/2002 | Varma et al. | |
| 6,553,446 B1 | 4/2003 | Miller | |
| 6,693,895 B1 | 2/2004 | Crummey et al. | |
| 6,948,094 B2 | 9/2005 | Schultz et al. | |
| 7,100,020 B1 | 8/2006 | Brightman et al. | |
| 7,397,774 B1 | 7/2008 | Holland et al. | |
| 7,849,214 B2 | 12/2010 | Park et al. | |
| 7,853,731 B1 | 12/2010 | Zeng | |
| 7,899,941 B2 | 3/2011 | Hendry et al. | |
| 7,941,682 B2 | 5/2011 | Adams | |
| 8,255,725 B2 | 8/2012 | Shimazaki et al. | |
| 8,352,624 B2 | 1/2013 | Zimmerman et al. | |
| 8,468,285 B2 | 6/2013 | Kobayashi | |
| 8,656,228 B2 | 2/2014 | Check et al. | |
| 8,788,822 B1 | 7/2014 | Riddle | |
| 8,799,537 B1 | 8/2014 | Zhu et al. | |
| 8,848,809 B2 | 9/2014 | Whitby-Strevens | |
| 9,164,930 B2 | 10/2015 | Zeng et al. | |
| 9,319,090 B2 | 4/2016 | Whitby-Strevens | |
| 9,544,069 B2 | 1/2017 | Whitby-Strevens et al. | |
| 10,326,981 B2 | 6/2019 | Nisenzon | |
| 2002/0044553 A1 | 4/2002 | Chakravorty | |
| 2002/0169938 A1 | 11/2002 | Scott et al. | |
| 2004/0041029 A1 | 3/2004 | Postman et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0098955 A1 | 5/2005 | Rasmussen | |
| 2005/0117601 A1 | 6/2005 | Anderson et al. | |
| 2005/0157781 A1 | 7/2005 | Ho et al. | |
| 2005/0285862 A1 | 12/2005 | Noda et al. | |
| 2007/0070997 A1 | 3/2007 | Weitz et al. | |
| 2007/0201492 A1 | 8/2007 | Kobayashi | |
| 2007/0286246 A1 | 12/2007 | Kobayashi et al. | |
| 2008/0133798 A1 | 6/2008 | Park et al. | |
| 2008/0231711 A1 | 9/2008 | Glen et al. | |
| 2008/0235355 A1 | 9/2008 | Spanier et al. | |
| 2008/0301148 A1 | 12/2008 | Lee et al. | |
| 2009/0010533 A1 | 1/2009 | Hung et al. | |
| 2009/0024924 A1 | 1/2009 | Kim | |
| 2009/0189442 A1 | 7/2009 | Chi | |
| 2010/0017655 A1 | 1/2010 | Gooding et al. | |
| 2010/0037283 A1 | 2/2010 | Zhu et al. | |
| 2010/0082859 A1 | 4/2010 | Hendry et al. | |
| 2010/0098419 A1 | 4/2010 | Levy et al. | |
| 2010/0104221 A1 | 4/2010 | Yeung et al. | |
| 2010/0177245 A1* | 7/2010 | Ohnuma | H04N 21/436 348/563 |
| 2010/0329319 A1 | 12/2010 | Dai et al. | |
| 2011/0052142 A1 | 3/2011 | Sultenfuss et al. | |
| 2011/0087854 A1 | 4/2011 | Rushworth et al. | |
| 2011/0134291 A1 | 6/2011 | Rueckert et al. | |
| 2011/0219208 A1 | 9/2011 | Asaad et al. | |
| 2011/0242425 A1 | 10/2011 | Zeng | |
| 2011/0276710 A1 | 11/2011 | Mighani et al. | |
| 2011/0310296 A1 | 12/2011 | Lee et al. | |
| 2011/0320861 A1 | 12/2011 | Bayer et al. | |
| 2012/0127367 A1 | 5/2012 | Glen et al. | |
| 2012/0146989 A1 | 6/2012 | Whitby-Strevens | |
| 2012/0224640 A1 | 9/2012 | Sole et al. | |
| 2012/0229076 A1 | 9/2012 | Zhu et al. | |
| 2013/0003639 A1* | 1/2013 | Noh | H04W 72/046 370/312 |
| 2013/0050216 A1 | 2/2013 | Whitby-Strevens et al. | |
| 2013/0057567 A1 | 3/2013 | Frank et al. | |
| 2013/0162911 A1 | 6/2013 | Glen | |
| 2013/0222652 A1 | 8/2013 | Akeley et al. | |
| 2013/0235941 A1 | 9/2013 | Koo et al. | |
| 2013/0311669 A1 | 11/2013 | Reimers et al. | |
| 2014/0247983 A1 | 9/2014 | MacInnis et al. | |
| 2014/0273833 A1 | 9/2014 | McCormack et al. | |
| 2014/0293135 A1* | 10/2014 | Shao | H04N 21/44231 348/634 |
| 2015/0036051 A1 | 2/2015 | Broberg et al. | |
| 2015/0092646 A1 | 4/2015 | Tabet et al. | |
| 2015/0117601 A1* | 4/2015 | Keeve | A61B 6/5241 378/41 |
| 2015/0189109 A1 | 7/2015 | Colin | |
| 2015/0205749 A1 | 7/2015 | Whitby-Strevens et al. | |
| 2015/0237264 A1 | 8/2015 | Amitay et al. | |
| 2015/0378737 A1 | 12/2015 | Debbage et al. | |
| 2016/0077989 A1 | 3/2016 | Pulyala et al. | |
| 2016/0103480 A1 | 4/2016 | Sanghi et al. | |
| 2016/0103689 A1 | 4/2016 | Sanghi et al. | |
| 2016/0103743 A1 | 4/2016 | Sanghi et al. | |
| 2016/0224442 A1 | 8/2016 | Sanghi et al. | |
| 2016/0275919 A1* | 9/2016 | Lawrence | G09G 5/363 |
| 2016/0364350 A1 | 12/2016 | Sanghi et al. | |
| 2018/0129261 A1 | 5/2018 | Garg et al. | |
| 2018/0129269 A1 | 5/2018 | Garg et al. | |
| 2018/0129270 A1 | 5/2018 | Garg et al. | |

OTHER PUBLICATIONS

PCI Express base Specification Revision 3.0, published Nov. 10, 2010.
PCI Express Base Specification Revision 3.1, published Octobers, 2014.
Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

METHODS AND APPARATUS FOR MULTI-LANE MAPPING, LINK TRAINING AND LOWER POWER MODES FOR A HIGH SPEED BUS INTERFACE

PRIORITY

This application is a continuation of and claims the benefit of priority to co-owned U.S. patent application Ser. No. 15/620,595, filed on Jun. 12, 2017 of the same title and issuing as U.S. Pat. No. 10,523,867 on Dec. 31, 2019, which claims the benefit of priority to U.S. Provisional Patent Application Ser. No. 62/348,749 filed Jun. 10, 2016 of the same title, the content of each of the foregoing incorporated herein by reference in its entirety.

RELATED APPLICATIONS

This application is related to U.S. patent application Ser. No. 13/274,225 filed Oct. 14, 2011 and entitled "Method and Apparatus for Low Power Audio Visual Interface Calibration", issued as U.S. Pat. No. 8,848,809 on Sep. 30, 2014; U.S. patent application Ser. No. 14/500,817 filed Sep. 29, 2014 of the same title, issued as U.S. Pat. No. 9,319,090 on Apr. 19, 2016; U.S. patent application Ser. No. 14/566,454 filed Dec. 10, 2014 and entitled "Methods and Apparatus for Virtual Channel Allocation via a High Speed Bus Interface", issued as U.S. Pat. No. 9,892,084 on Feb. 13, 2018; U.S. patent application Ser. No. 14/566,554 filed Dec. 10, 2014 and entitled "Apparatus and Methods for Packing and Transporting Raw Data", issued as U.S. Pat. No. 10,459,674 on Oct. 29, 2019; U.S. patent application Ser. No. 14/550,698 filed Nov. 21, 2014 and entitled "Methods and Apparatus for Link Training, Initialization and Management via a High Speed Bus Interface", issued as U.S. Pat. No. 9,544,069 on Jan. 10, 2017; and U.S. patent application Ser. No. 14/856,283 filed Sep. 16, 2015 and entitled "Methods and Apparatus for Aggregating Packet Transfer over a Virtual Bus Interface", issued as U.S. Pat. No. 9,830,289 on Nov. 28, 2017, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of audio/visual (A/V) consumer electronics devices, as well as networks thereof. More particularly, in one exemplary aspect, the disclosure is directed to methods and apparatus adapted to train, initialize, and manage a unidirectional, sink-driven A/V interface.

2. DESCRIPTION OF RELATED TECHNOLOGY

DisplayPort® is an exemplary and emerging digital display interface technology specified by the Video Electronics Standards Association (VESA). Current incarnations of the standard specify support for simple networking of digital audio/visual (A/V) interconnects, intended to be used primarily between an arbitrary assembly of multimedia "sources" (e.g., computers or CPUs) and "sinks" (e.g. display monitors, home-theater system, etc.). This interconnection is generally unidirectional in nature; i.e., from source to sink, in current implementations.

For reasons described in greater detail hereinafter, incipient research is directed to leveraging portions of DisplayPort technology for internal consumer electronics device operations (e.g., bus interfaces, etc.). Various implementation specific considerations require substantial modifications to the underlying DisplayPort control scheme. For example, certain internal components (e.g., camera modules) lack sufficient processing capabilities to comply with DisplayPort bus protocols including, but not limited to, link training, initialization, and management. Other aspects of the DisplayPort protocol may be "over-designed", or provide capabilities which are unnecessary.

Accordingly, improved methods and apparatus are needed to support internal consumer electronics device operations using DisplayPort technology (such as link training, initialization, and management). More generally, apparatus and methods are needed for calibrating and configuring internal components of a consumer electronics device.

SUMMARY

The present disclosure satisfies the foregoing needs by providing, inter alia, improved methods and apparatus adapted to train, initialize, and manage a unidirectional, sink-driven A/V interface.

In a first aspect, a method for implementing a link training protocol for a unidirectional link is disclosed. In one embodiment, the method includes performing the link training protocol over a multi-lane unidirectional link.

In another embodiment, responsive to receipt of a link power on command, training the unidirectional main link of the camera interface system, the training includes transmitting one or more link training data that enables data transactions via the trained unidirectional main link; when the unidirectional main link is successfully trained and one or more data is available for transaction, transacting the one or more data; otherwise, when the unidirectional main link is successfully trained and no data is available for transaction, transitioning to the low power state; and responsive to the transition to the low power state, caching at least a portion of the one or more link training data, where the at least the portion of the cached one or more link training data obviates at least one step of a subsequent link training process for the unidirectional main link.

In a second aspect, a method for implementing lower power modes of operation is disclosed. In one embodiment, the method includes framing a plurality of differing packet types present within a given frame, the given frame consisting of an active pixel stream area and one or more blanking period areas; transmitting the framed plurality of differing packet types in a sequential manner; and entering a low power mode upon completion of transmission of the framed plurality of differing packet types. The completion of transmission occurring before the end of a time period associated with the given frame.

In another embodiment, the method includes generating a frame of data for transmission from a source device to a sink device; inserting a frame control packet around a plurality of types of data of the frame of data, transmitting the plurality of types of data with respective frame control packets irrespective of one or more blanking intervals; and transitioning the link to a lower power state upon completion of the transmission.

In one variant, the generating of the frame of data for transmission from the source device to the sink device occurs subsequent to training of the link for the camera interface system.

In another variant, the training of the link for the camera interface system further includes: responsive to receiving a link power on command, training the link of the camera interface system by transmitting one or more link training data from the source to the sink, the one or more link training data enabling data transactions via the trained link.

In yet another variant, prior to the transitioning the link to the lower power state upon completion of the transmission further includes: caching at least a portion of the one or more link training data, where the cached at least a portion of the one or more link training data obviates at least one step of a subsequent link training process.

In yet another variant, prior to the transitioning of the link to the lower power state, determining whether a new frame of data is ready for transmission.

In yet another variant, the transmitting of the plurality of types of data with the respective frame control packets irrespective of the one or more blanking intervals is enabled via the inserting of the frame control packet around the plurality of types of data of the frame of data.

In yet another variant, the method further includes transmitting a power up command to the sink subsequent to the transitioning of the link to the lower power state, the transmitting of the power up command occurring responsive to determining that a new frame of data is ready for transmission.

In a third aspect, a method for transitioning out of a low power state is disclosed. In one exemplary embodiment, the method includes: responsive to receiving a link power on command, training a link of the camera interface system, the training resulting in one or more link training data that enables data transactions via the trained link; when the link is successfully trained and one or more data is available for transaction, transacting the one or more data.

In a fourth aspect, a method for transitioning into a lower power state is disclosed. In one exemplary embodiment, the method includes: when a link is successfully trained and no data is available for transaction, transitioning to a low power mode; and responsive to transitioning to the low power mode, caching one or more link training data, where the cached one or more link training data obviates at least one step of a subsequent link training process.

In a fifth aspect, a method for transmitting a plurality of symbols over a unidirectional multi-lane link is disclosed. In one embodiment, the method includes arranging a plurality of symbols in a sequential order and transmitting a first portion of the arranged symbols simultaneously over the unidirectional multi-lane link.

In a sixth aspect, a method for conserving power in a link of a camera interface system is disclosed. In one embodiment, the method includes responsive to receiving a link power on command, training a link of the camera interface system, the training resulting in one or more link training data that enables data transactions via the trained link; when the link is successfully trained and one or more data is available for transaction, transacting the one or more data; otherwise, when the link is successfully trained and no data is available for transaction, transitioning to a low power mode; and responsive to transitioning to the low power mode, caching the one or more link training data, where the cached one or more link training data obviates at least one step of a subsequent link training process.

In a seventh aspect, a camera interface system is disclosed. In one embodiment, the camera interface system includes a camera module having a plurality of sensor modules, as well as an integrated circuit coupled to the camera module via a multi-lane unidirectional link. Both the camera module and the integrated circuit are configured to perform the aforementioned methodologies.

In another embodiment, the camera interface system includes a camera module that is coupled with an integrated circuit via a unidirectional main link as well as a bidirectional auxiliary link, the camera module including a source device and the integrated circuit including a sink device. The camera interface system further includes logic configured to: generate a frame of data for transmission from the source device to the sink device via the unidirectional main link; insert a frame control packet around a plurality of types of data of the frame of data; transmit the plurality of types of data with respective frame control packets irrespective of one or more blanking intervals via the unidirectional main link; and transition the unidirectional main link to a lower power state upon completion of the transmission.

In one variant, the camera interface system further includes logic configured to: transmit a power up command to the sink subsequent to the transition of the unidirectional main link to the lower power state, the transmission of the power up command occurring responsive to determination that a new frame of data is ready for transmission.

In another variant, the bidirectional auxiliary link is utilized at least in part for training of the unidirectional main link.

In yet another variant, the camera interface system further includes logic configured to: responsive to receipt of a link power on command, train the unidirectional main link of the camera interface system, the training including transmission of one or more link training data that enables data transactions via the trained unidirectional main link; when the unidirectional main link is successfully trained and one or more data is available for transaction, transact the one or more data; otherwise, when the unidirectional main link is successfully trained and no data is available for transaction, transitioning to the low power state; and responsive to the transition to the low power state, cache at least a portion of the one or more link training data, where the at least a portion of the cached one or more link training data obviates at least one step of a subsequent link training process for the unidirectional main link.

In yet another variant, the training of the unidirectional main link utilizes a waterfall model for training, the waterfall model for training of the unidirectional main link includes: a verification of data rate associated with a physical layer of the unidirectional main link, followed by subsequent verifications at a link layer of the unidirectional main link, followed by additional verifications at a protocol layer of the unidirectional main link.

In yet another variant, the transmission of the plurality of types of data with the respective frame control packets irrespective of the one or more blanking intervals is enabled via the insertion of the frame control packet around the plurality of types of data of the frame of data.

In yet another variant, the camera interface system further includes logic configured to: transmit a power up command to the sink subsequent to the transitioning of the unidirectional main link to the lower power state, the transmission of the power up command occurring responsive to determination that a new frame of data is ready for transmission.

In an eighth aspect, a camera module is disclosed. In one embodiment, the camera module includes a TX camera interface coupled to a unidirectional multi-lane link as well as an auxiliary link, and one or more sensor modules in signal communication with the TX camera interface. The camera module is further configured to implement at least portions of the aforementioned methodologies.

In a second embodiment, the camera module includes a transmitting (TX) camera interface that is coupled to a plurality of camera sensors; a unidirectional main link coupled to the TX camera interface, the unidirectional main link enabling the transmission of data from the TX camera interface to a receiving (RX) camera interface; and a bidirectional auxiliary link, the bidirectional auxiliary link utilized in part for the training of the unidirectional main link. The TX camera interface further includes logic configured to: generate a frame of data for transmission from the TX camera interface to the RX camera interface via the unidirectional main link; insert a frame control packet around a plurality of types of data of the frame of data; transmit the plurality of types of data with respective frame control packets irrespective of one or more blanking intervals via the unidirectional main link; and transition the unidirectional main link to a lower power state upon completion of the transmission.

In one variant, the TX camera interface further includes logic configured to: transmit a power up command to the RX camera interface subsequent to the transition of the unidirectional main link to the lower power state, the transmission of the power up command occurring responsive to determination that a new frame of data is ready for transmission.

In another variant, the TX camera interface further includes logic configured to: responsive to receipt of a link power on command from the RX camera interface via the bidirectional auxiliary link, train the unidirectional main link of the camera module, the training includes transmission of one or more link training data that enables data transactions via the trained unidirectional main link; when the unidirectional main link is successfully trained and one or more data is available for transaction, transmit the one or more data via the unidirectional main link; otherwise, when the unidirectional main link is successfully trained and no data is available for transaction, transitioning to the low power state; and responsive to the transition to the low power state, cache at least a portion of the one or more link training data, where the at least the portion of the cached one or more link training data obviates at least one step of a subsequent link training process for the unidirectional main link.

In yet another variant, the transmission of the plurality of types of data with the respective frame control packets irrespective of the one or more blanking intervals is enabled via the insertion of the frame control packet around the plurality of types of data of the frame of data.

In yet another variant, the TX camera interface further includes logic configured to: transmit a power up command to the sink subsequent to the transitioning of the unidirectional main link to the lower power state, the transmission of the power up command occurring responsive to determination that a new frame of data is ready for transmission.

In yet another variant, prior to the transition of the unidirectional main link to the lower power state, determine whether a new frame of data is ready for transmission.

In a ninth aspect, an integrated circuit is disclosed. In one embodiment, the integrated circuit consists of a system on a chip that includes a RX camera interface. The system on a chip is further configured to implement at least portions of the aforementioned methodologies.

In another aspect of the present disclosure, a computer-readable apparatus is disclosed. In one embodiment, the computer-readable apparatus includes a storage medium having computer-readable instructions stored thereon, the computer-readable instructions being configured to, when executed by a processor apparatus of a computerized source device, cause the computerized source device to: generate a frame of data for transmission, the frame of data comprising a plurality of data packets; frame the plurality of data packets with corresponding frame control packets; transmit the plurality of data packets to a sink device; and transition the unidirectional link to a lower power state after the transmission of the one or more data packets.

Other features and advantages of the present disclosure will immediately be recognized by persons of ordinary skill in the art with reference to the attached drawings and detailed description of exemplary embodiments as given below.

Figure 1:
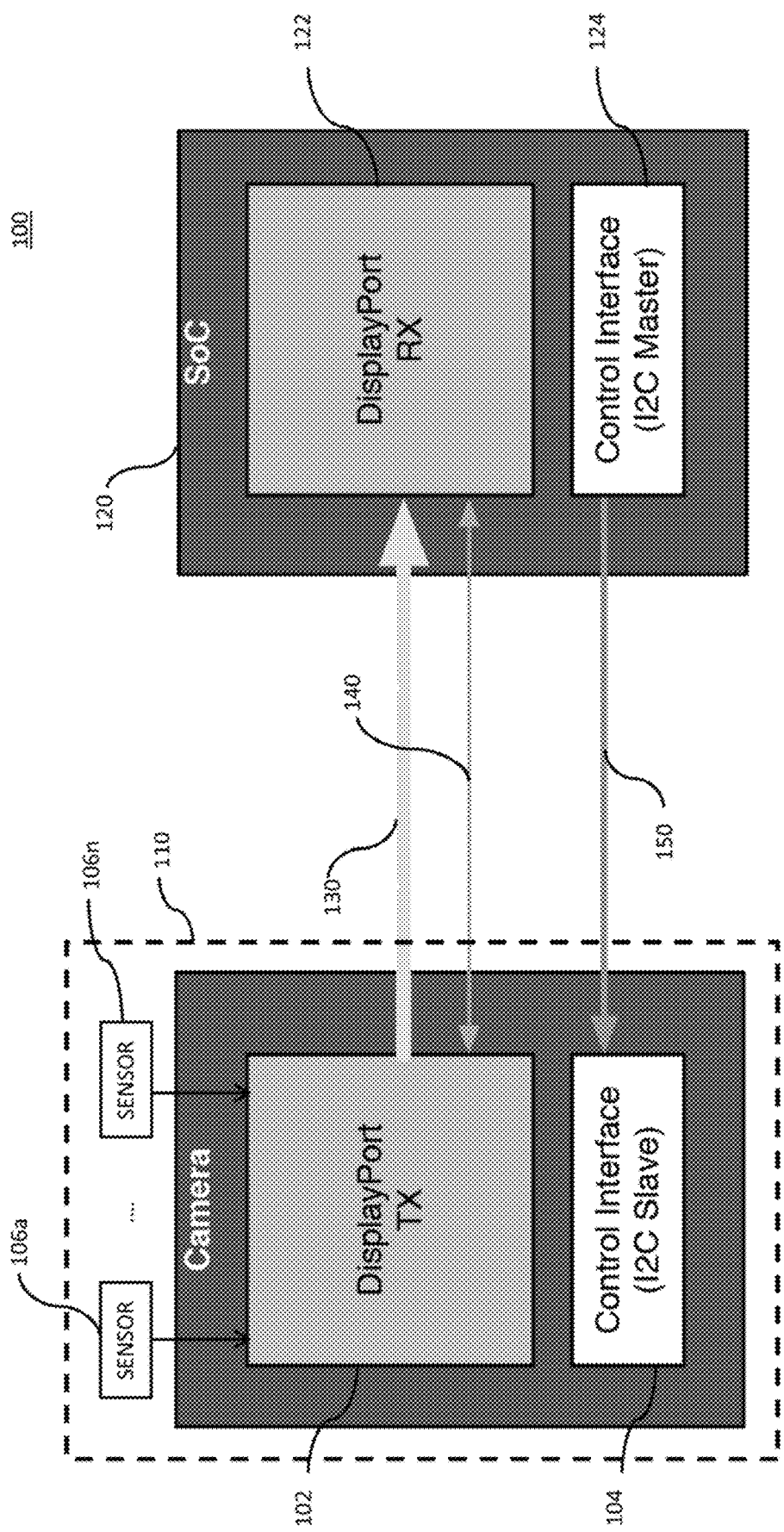
FIG. 1 is a block diagram illustrating an exemplary camera interface system in accordance with the principles of the present disclosure.

All Figures © Copyright 2015-2016 Apple Inc. All rights reserved.

DETAILED DESCRIPTION

Reference is now made to the drawings, wherein like numerals refer to like parts throughout.

As used herein, the term "DisplayPort" refers without limitation to apparatus and technology compliant with one or more of "VESA DisplayPort Standard"—Version 1.4 dated Mar. 1, 2016; "VESA DisplayPort Standard"—Version 1.3 dated Sep. 15, 2014; "VESA DisplayPort Standard"—Version 1.2 dated Dec. 22, 2009; "VESA DisplayPort Standard"—Version 1, Revision 1a dated Jan. 11, 2008; "VESA DisplayPort Panel Connector Standard"—Version 1.1 dated Jan. 4, 2008; "VESA DisplayPort™ PHY Compliance Test Standard"—Version 1 dated Sep. 14, 2007; "VESA DisplayPort™ Link Layer Compliance Test Standard"—Version 1.0, dated Sep. 14, 2007, as well as "VESA Embedded DisplayPort (eDP) Standard"—Version 1.4, each of the foregoing being incorporated herein by reference in its entirety, and any subsequent revisions thereof.

DETAILED DESCRIPTION OF EXEMPLARY EMBODIMENTS

Exemplary embodiments are now described in detail. While these embodiments are primarily discussed in the context of a camera system for a consumer electronics device, the general principles and advantages may be extended to other wireless or wired networks where a unidirectional network must be initialized by the receiver of data, the following therefore being merely exemplary in nature.

Overview—

The disclosure is directed to methods and apparatus adapted to train, initialize, and manage a unidirectional, sink-driven A/V interface. Specifically, various aspects of the present disclosure are directed to a multi-lane high speed bus that is optimized for transferring audio/visual (A/V) data at slower rates. As a brief aside, bus technologies continue to improve enabling faster data rates; however certain applications (such as video replay, A/V rendering, etc.) have rigid timing requirements which do not significantly change over time. While such applications may receive limited benefit from increased bus speeds, the bus speed may be used to improve power consumption by transferring data as quickly as possible and then transitioning to a low power state. By delivering A/V data earlier and powering off for longer time intervals, the high speed bus can reduce power consumption.

To these ends, in one aspect of the present disclosure, the high speed bus is configured to use a packet format structure that allows for more fluid data delivery times, thereby allowing the high speed bus to deliver A/V data at times selected to reduce power consumption (rather than in accordance with strict A/V data timing requirements). In one exemplary embodiment, the packet format structure introduces a frame control packet (FCP) that is used to signal the packet type at flexible times, rather than in accordance with e.g., isochronous frame delivery boundaries. In one exemplary variant, the FCP can indicate e.g.: the start of a line, end of a line, start of a frame or end of a frame, the start and end of camera stream attribute (CSA) packets, and the start and end of secondary data packets. By decoupling FCP delimited data from traditional frame boundaries, the high speed capabilities of cutting edge bus technologies can be used to their utmost.

In another aspect of the present disclosure, intelligent schemes for entering and exiting low power modes of a high speed bus are disclosed. As a brief aside, existing bus technologies require link training procedures when initializing a link. These link training procedures only occur at the beginning of link operation, and do not need to be performed throughout operation. However, entering a low power mode generally requires link re-initialization, as the link training information is lost in the low power mode. The aforementioned embodiments of the present disclosure are envisioned transitioning between low power and normal operation for e.g., every frame of video data. Accordingly, in another complementary but distinct aspect of the present disclosure, the high speed bus can significantly reduce link re-initialization overhead by caching link initialization data for subsequent link re-initialization. Various high speed bus embodiments described herein are configured to transition out of lower power modes without having to perform significant sections of link training (e.g., receiver equalization, etc.) Still other optimizations of high speed link operation are described in greater detail hereinafter.

DisplayPort Technology—

Extant DisplayPort technology is an extensible digital interface solution that is designed for a wide variety of performance requirements, and broadly supports PCs, monitors, panels, projectors, and high definition (HD) content applications. DisplayPort technology is capable of supporting both internal chip-to-chip, and external box-to-box digital display connections. Examples of internal chip-to-chip applications include notebook PCs which drive a display panel from a graphics controller, or display components from display controllers driving the monitor of a TV. Examples of box-to-box applications include display connections between PCs and monitors, and projectors (e.g., not housed within the same physical device).

The camera component inside most consumer electronics devices (e.g., iOS devices such as the iPad and iPhone devices manufactured by the Assignee hereof) is a simple image sensor and/or controller that does not have significant indigenous processing capabilities. Traditionally, camera data was streamed via a Mobile Industry Processor Interface (MIPI) to the application processor. Incipient research is directed to adapting DisplayPort technology for use with internal components (such as the aforementioned camera sensors that lack processing capability). DisplayPort technologies offer, inter alia, much higher bandwidths and other desirable features (e.g., multi-stream capability, etc.).

As a brief aside, DisplayPort provides unidirectional transmission of audio and video data from source nodes (where the content is generated from) to sink nodes (which consumes content), and an auxiliary channel (back-channel) for capability and status information to be sent from the sink to the source. Unlike typical bi-directional bus and network technologies, unidirectional device technologies (e.g. audio-visual systems such as DisplayPort, HDMI, DVI, etc.) have resisted bus or network arbitration, as the overhead imposed by such networking layers provides minimal benefit for direct source-to-sink type connections. The primary and auxiliary channels operate in "master/slave" mode under control of the master node. The master node controls both the low-level transmission of data between source and sink, and the higher level management of the display and networking.

Unfortunately, the exemplary DisplayPort technologies were designed for a "smart source" paradigm; i.e., the device providing the data performs bus management. In view of the capabilities of camera components (and other similarly limited components), DisplayPort and other "smart source" technologies must be adapted for use in a "smart sink" paradigm. Specifically, in smart sink applications, the slave source (e.g., a camera sensor) generates data/content for the master sink (e.g., the application processor(s), system on a chip integrated circuit(s), etc.).

Additionally, the full suite of DisplayPort capabilities may be unnecessary; other simplifications may further improve performance on controllers having very modest capabilities.

Apparatus—

Referring now to FIG. 1, an exemplary camera interface system 100 is illustrated that consists of a camera module 110 that is electrically coupled with an integrated circuit 120 (for example, a system on a chip (SoC)). In the illustrated embodiment, both the camera module 110 and integrated circuit 120 include DisplayPort components. The camera module 110 includes a transmitting (TX) camera interface 102 (as a DisplayPort source) that is coupled to a plurality of camera sensors 106a-106n. In some cases, the camera sensors may be coupled to the TX camera interface 102 via vendor specific interfaces, etc. The SoC receiver 122 receives the DisplayPort stream (as a DisplayPort sink).

In one exemplary implementation, the camera interface system 100 consists of two camera sensors for use with an exemplary iPhone manufactured by the Assignee hereof. In alternative implementations, the exemplary camera interface system 100 is utilized in other computing device platforms such as laptop computers, tablet computers, etc. The sensors may include, for example, both a forward-facing camera sensor (e.g., for taking pictures/video of interest) as well as a backward-facing camera sensor (e.g., for taking self-portraits, etc.). While a plurality of camera sensors are illustrated in FIG. 1, it is appreciated that in certain implementations, the number of camera sensors can be readily reduced to a single camera sensor or increased to three or more camera sensors in alternative implementations.

In the illustrated embodiment, the TX camera interface 102 is coupled to a receiving (RX) camera interface 122 via a unidirectional main link 130 (i.e., from the TX camera interface 102 to the RX camera interface 122) as well as via a bidirectional auxiliary link 140. The main link 130 consists of a multi-stream transport (MST) that, in an exemplary implementation, consists of one (1), two (2), three (3), or four (4) lanes. While a MST consisting of four (4) lanes is primarily described, it is appreciated that the number of lanes may adapted to include more or less lanes in alternative variants that would be readily apparent to one of ordinary skill given the contents of the present disclosure. The main link 130 is utilized to transport isochronous data streams (such as a camera image data stream coming from camera sensors 106a-106n) as well as auxiliary/secondary data. The main link 130 does not include a dedicated clock channel and all lanes are designated to carry data. Accordingly, the clock signal is extracted from the data stream itself. The data stream is, in exemplary implementations, encoded with a line coding scheme such as, for example, an 8 b/10 b coding scheme for lower data rates (e.g., less than or equal to 6.6 Gbps) and a 128 b/132 b coding scheme for higher data rates (e.g., greater than 6.6 Gbps). While the aforementioned 8 b/10 b and 128 b/132 b line coding schemes are exemplary, it is appreciated that other line coding schemes could be utilized in alternative implementations. The line coding scheme selected is, in an exemplary implementation, communicated between the TX camera interface 102 and the RX camera interface 122 using an I²C link 150 that communicates data between control interface 124 (e.g., the I²C master) and control interface 104 (e.g., the I²C slave).

The bidirectional auxiliary (AUX) channel 140 is utilized in part for so-called link training as discussed subsequently herein, and more specifically in exemplary embodiments for initiation, selection of training pattern set(s), as well as to check the training status between the TX camera interface 102 and the RX camera interface 122. In one exemplary implementation, the AUX channel 140 is an alternating current (AC) coupled, 50 ohm double-terminated, single-ended signal driven channel that is driven by either or both of the TX camera interface 102 and the RX camera interface 122. In the aforementioned exemplary implementation, the AUX channel 140 is half-duplex and bidirectional in nature with the TX camera interface 102 acting as the master while the RX camera interface 122 acts as the slave. In one exemplary implementation, the AUX channel provides a data rate of 1 Mbps using Manchester-II coding. Contrast the data rate of the AUX channel 140 (i.e., 1 Mbps) with that of the main link which can exceed 10 Gbps. In the context of an exemplary DisplayPort implementation, the electrical specification for the AUX channel 140 is as shown in Table 1 below:

TABLE 1

| Parameter | Min | Max | Units |
| --- | --- | --- | --- |
| Voltage swing at transmitting pin | 0.36 | 0.68 | V |
| Termination resistance | 40 | 60 | ohm |
| Termination voltage | 0 | 2.0 | V |
| AC-coupling capacitance | 75 | 125 | nF |
| Receiver input sensitivity | $V_{AUX-DC-CM} \pm 100$ mV | — | V |

The AUX channel 140 is also utilized in one or more exemplary implementations for interrupt signaling by the TX camera interface 102. The TX camera interface 102 may also initiate a native AUX transaction to write registers residing within the RX camera interface 122. The RX camera interface 122 is also enabled to read and clear the interrupt source through the I²C bus 150 in some implementations.

Unlike the operation of the AUX channel 140, the control interface 104 residing in the camera module 110 acts as an I²C slave device of the I²C link 150, while the control interface 124 within integrated circuit 120 acts as an I²C master device of the I²C link 150. The I²C bus can support multiple size index addressing (e.g., 8-bit, 16-bit, 24-bit, etc.) with the selection of 24-bit index addressing being exemplary for the mapping of DisplayPort Configuration Data (DPCD) addresses. In one or more implementations, the camera module 110 has multiple slave addresses configured to connect with integrated circuit 120. Each of these slave addresses can be implemented with index addressing of different sizes (e.g., 8-bit, 16-bit, 24-bit, etc.). Exemplary I²C packets for each of the 8-bit, 16-bit and 24-bit implementations are illustrated below at Table 2.

TABLE 2

| 8 bit Index Addressing | | | | Index[7:0] | | | | |
| --- | --- | --- | --- | --- | --- | --- | --- | --- |
| S | Slave Address | R/W | A | Offset Address | A | Data | A/$\overline{A}$ | P |
| 16 bit Index Addressing | | | | Index[15:8] | | Index[7:0] | | |
| S | Slave Address | R/W | A | Offset Address | A | Offset Address | A | Data | A/$\overline{A}$ | P |
| 24 bit Index Addressing | | Index[23:16] | | Index[15:8] | | Index[7:0] | | |
| S | Slave Address | R/W | A | Offset Address | A | Offset Address | A | Offset Address | A | Data | A/$\overline{A}$ | P |

With the topology defined with regards to the exemplary implementation shown in FIG. 1, various features and methodologies associated with camera interface system 100 are now described in subsequent detail herein.

Multi-Lane Mapping—

Figure 2:
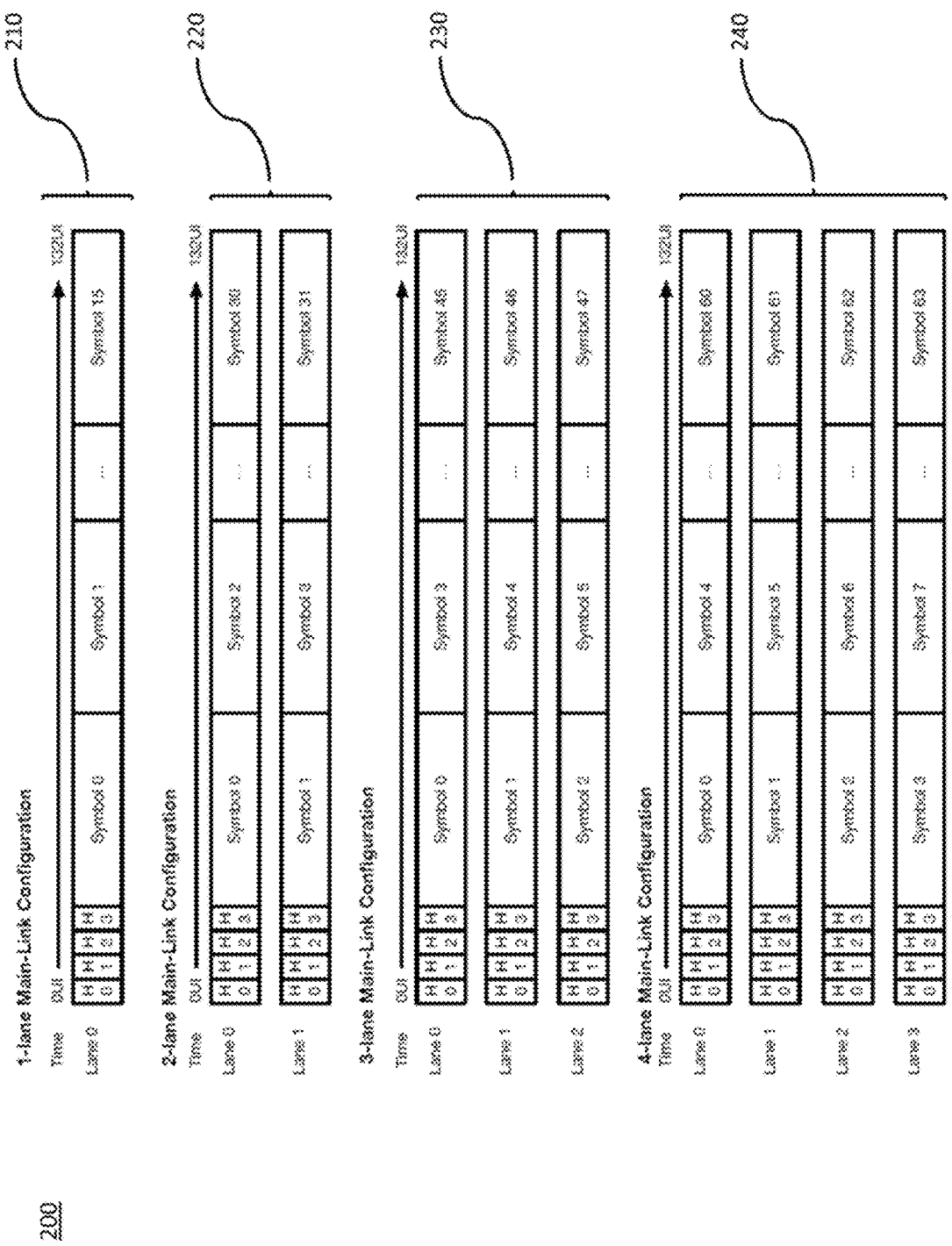
FIG. 2 is a schematic illustrating various single and multi-lane symbol mappings in accordance with the principles of the present disclosure.

Referring now to FIG. 2, advantages associated with multi-lane mapping 200 via a comparison between one (1), two (2), three (3) and four (4) unidirectional main links 130 are shown and described in detail. Specifically, by striping data across various lanes in, for example, a four-lane main link configuration 240, reduced latency and the more efficient pipelining of data is achieved as compared with, for example, a single-lane main link configuration 210. For example, for a given period of time, if the single-lane main link configuration 210 is able to transmit sixteen (16) symbols, then the four-lane main link configuration 240 is able to transmit sixty-four (64) symbols for the same given period of time. Moreover, for a three-lane main link configuration 230, forty-eight (48) symbols would be transmitted for the given period of time, while with the two-lane link configuration thirty-two (32) symbols would be transmitted for the given period of time. Accordingly, a four-line main link configuration 240 would have four (4) times the amount of data throughput as compared with a single-lane main link configuration 210.

While the foregoing example is based on equal and equivalent data rates across each lane; artisans of ordinary skill in the related arts will readily appreciate that other configurations may provide varying data rates and/or data types across the lanes. For example, some embodiments may throttle some lanes up or down so as to compensate for varying levels of interference resistance (e.g., by more heavily coding the data) and/or minimize electromagnetic interference with other components. Other embodiments may assign particular types of data to lanes (e.g., dedicated lanes for video data, audio data, redundancy data, etc.) Other lane configurations are readily appreciated by those of ordinary skill in the related arts, given the contents of the present disclosure.

Referring back to FIG. 2, the symbols for the multi-lane configurations 220, 230, 240 are transmitted in numerical order. In other words, for a given transmission period for a four-line main link configuration 240, the symbols would be transmitted simultaneously in numerical order (e.g., Symbol 0 for lane 1, Symbol 1 for lane 2, Symbol 2 for lane 3, and Symbol 3 for lane 4) followed by subsequent symbol transmission in numerical order (e.g., Symbol 4 for lane 1, Symbol 5 for lane 2, Symbol 6 for lane 3, and Symbol 7 for lane 4). In the aforementioned exemplary DisplayPort implementation, it is generally considered more advantageous to transmit symbols in numerical order for, among other reasons, data processing efficiency.

In alternative embodiments, it is readily appreciated that the symbols could be transmitted in a non-numerical order. For example, at a first transmission time, Symbol 0 is transmitted for lane 1, Symbol 4 for lane 2, Symbol 8 for lane 3, and Symbol 12 for lane 4; a subsequent transmission time provides Symbol 1 on lane 1, Symbol 5 for lane 2, Symbol 9 for lane 3, and Symbol 13 for lane 4). Such configurations may be useful to disperse the effects of bursty interference. More directly, such implementations may be useful for designs where the receiver's forward error correction schemes can recover corrupted symbols so long as the neighboring symbols are unaffected. Still other lane striping schemes for e.g., improving robustness, reducing processing complexity, improving power consumption, etc. may be substituted with equal success by those of ordinary skill in the related arts, given the contents of the present disclosure.

In exemplary embodiments, each lane of a multi-lane configuration transmits the same block header simultaneously, regardless of the specific implementation chosen. In other embodiments, the block headers may be transmitted at different times for each of the lanes. For example, in one such variant, the block headers may be transmitted with a pre-determined skew that is intentionally inserted so as to ensure that all the block headers are not susceptible to corruption at the same time. On receipt, the receiver recovers the block header based on the appropriate de-skew values. Regardless of implementation, artisans of ordinary skill in the related arts will appreciate that block headers are a fixed reference for the data format and are important for e.g., recovering the data payload.

Link Training—

Figure 3:
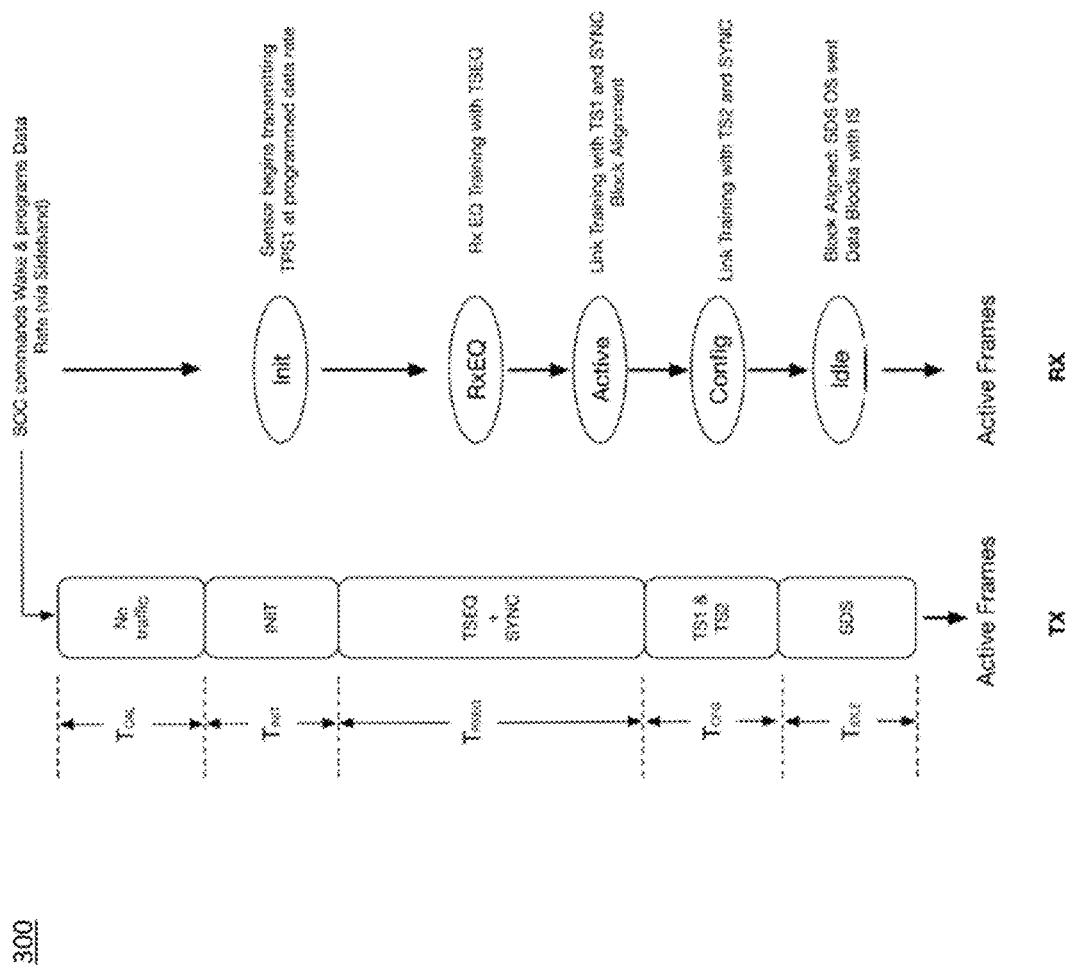
FIG. 3 is a schematic illustrating various link training states for the unidirectional main link in accordance with the principles of the present disclosure.

As the exemplary camera interface system 100 illustrated in FIG. 1 does not have a predetermined data throughput rate (i.e., the link between the TX camera interface 102 and the RX camera interface 122 over the unidirectional main link 130 is not clock driven (and hence, not fixed)), the unidirectional main link 130 will perform a link training protocol in order to ensure, inter alia, a synchronized yet dynamically adjustable throughput between the TX camera interface 102 and the RX camera interface 122. Referring now to FIG. 3, one such link training protocol 300 for ensuring synchronicity for the main link is shown and described in detail. Specifically, the left-hand column in FIG. 3 illustrates various ordered set symbols that are transmitted over the main link 130, while the right-hand column in FIG. 3 illustrates the various states of the link training process that are expected to occur on the receiving side of the main link 130.

Link training in accordance with the principles of the present disclosure is based on a so-called 'waterfall model' with programmable timers in the TX camera interface 102 and the RX camera interface 122, in order to keep the TX and RX timing in lockstep with one another. The use of the term 'waterfall model' refers to the fact that the unidirectional link is able to train the main link 130 with increasing levels of complexity by, for example, first verifying the data rate associated with the PHY layer, followed by subsequent verifications at the Link layer, the Protocol layer and so on and so forth. In other words, the link training test complexity illustrated in FIG. 3 builds upon itself and steadily increases, as the link training advances through the methodology described herein. While the foregoing scheme is described in terms of a "waterfall model", those of ordinary skill in the related arts will readily appreciate the use of other forms of testing. For example, so-called multiple exclusion cumulatively exhaustive (MECE) type testing methodologies and binary decision tree methodologies test multiple different exclusive functions, which when considered together are comprehensive. Still other testing/initialization schemes may be substituted with equal success by those of ordinary skill in the related arts, given the contents of the present disclosure.

Link training is initiated by the integrated circuit 120 through the issuance of I$^2$C commands over the I$^2$C bus 150. Subsequent to initiation by the integrated circuit 120, the INIT, TSEQ, TS1 and TS2 ordered sets along with the SYNC ordered set are transmitted from the TX camera interface 102 to the RX camera interface 122 and are used to train the main-link lanes of the unidirectional main link 130. Link training begins when the integrated circuit 120 issues a command to the camera module 110 to 'Power ON' or 'Wake up' over the I$^2$C bus 150. Upon receipt of the 'Power ON' or 'Wake up' command, the camera module 110 will maintain a quiet period on the unidirectional main link 130 for a period of time $T_{CAL}$ (i.e., no data is transmitted over the main link 130), after which it commences link training by repeated transmission of the INIT pattern over all active main-link lanes for a time period $T_{INIT}$ at pre-programmed drive strength and pre-emphasis levels before subsequently transitioning to the RxEQ state. The INIT pattern is depicted below in Table 3. Note that the INIT pattern is not encoded with the aforementioned line coding schemes (e.g., 8 b/10 b, 128 b/132 b line coding schemes, etc.).

TABLE 3

| Symbol Number | Pattern | Description |
| --- | --- | --- |
| N/A | 10101010b | Init Pattern |

The RX camera interface 122 will monitor the unidirectional main link 130 for receipt of the INIT pattern. The data rate of received INIT pattern will then be determined (e.g., via software executable on the integrated circuit 120) and subsequently programmed in to the receiver PHY.

In one exemplary implementation, the RX camera interface 122 will lock on to the incoming INIT patterns by performing a clock recovery procedure for a period of time of TNIT or less. If for some reason, the RX camera interface 122 fails to detect the INIT patterns; the control interface 124 will issue a command through I²C link 150 to restart link training. However, if the INIT patterns are successfully received, the LX camera interface will then transition into the RxEQ state of link training as indicated in FIG. 3. While the exemplary INIT pattern is selected to maximize clock content of the signal (and thus simplify signal detection), other patterns may be used with equivalent success by artisans of ordinary skill in the related arts, given the contents of the present disclosure. For example, some INIT patterns may seek to minimize external EM interference. Other INIT patterns may provide different gradients of clock resolution which can be used to rapidly diagnose poor link connectivity.

In some embodiments, the next step of the link training protocol 300 is to implement equalizer training. In other embodiments, receiver equalization is not implemented and the camera module 110 will transition from the INIT state to the Active state directly. During receiver equalization, the TX camera interface 102 transmits TSEQ ordered sets as defined in Table 4 reproduced infra with SYNC ordered sets inserted as set forth in Table 5 reproduced infra on all active lanes on the unidirectional main link 130 for a time period $T_{RXEQ}$ before transitioning into the Active state.

TABLE 4

| Symbol Number | Symbol | Description |
| --- | --- | --- |
| 0-3 | 87h | TSEQ Identifier |
| 4-5 | 00h | Reserved |
| 6-13 | 87h | TSEQ Identifier |
| 14 | 87h or DC balance Symbol | TSEQ Identifier or DC Balance Symbol: 20h when 1s needs to be reduced DFh when 0s needs to be reduced |
| 15 | 87h or DC balance Symbol | TSEQ Identifier or DC Balance Symbol: 08h when 1s needs to be reduced F7h when 0s needs to be reduced |

TABLE 5

| Symbol Number | Symbol | Description |
| --- | --- | --- |
| 0, 2, 4, 6, 8, 10, 12, 14 | 00h | SYNC Identifier |
| 1, 3, 5, 7, 9, 11, 13, 15 | FFh | SYNC Identifier |

The RX camera interface 122 monitors the unidirectional main link 130 for TSEQ ordered sets and performs symbol alignment on the incoming data stream within a time period $T_{INIT}$. In one or more implementations, the RX camera interface 122 can correct for lane polarity inversion on any of the active lanes of the unidirectional main link 130. By utilizing the TSEQ ordered sets to train the equalizer, the receiver finds the optimized operating conditions for the data rate that is currently being transmitted. The RX camera interface 122 completes equalizer training by receiving TSEQ ordered sets for a time period $T_{INIT}$ or less.

In one or more exemplary implementations, the TX camera interface 102 keeps track of the running disparity (i.e., DC balance) of the link for every TSEQ ordered set transmitted. For example, as illustrated in Table 4 supra, the TX camera interface decides at transmitted symbols 14 and 15, which TSEQ ordered set to transmit in order to maintain a running disparity of zero.

Upon entering the Active state as shown in FIG. 3, the camera module 110 will begin transmitting TS1 and TS2 ordered sets as illustrated in Tables 6 and 7 (see below) on all active lanes on the unidirectional main link 130. In one embodiment, the camera module 110 transmits sixty-four (64) TS1 ordered sets followed by sixty-four (64) TS2 ordered sets with SYNC ordered sets as illustrated in Table 5 supra before e.g., starting data transmissions and/or transitioning to the Idle state as illustrated in FIG. 3. As a brief aside, TS1 and TS2 patterns are transmitted to the receiver to assist in block alignment. In one exemplary variant, a sync pattern is inserted after every thirty-two (32) TS1 or TS2 ordered sets. The sync pattern triggers a reset for the scrambler in the receiver and can also be used by the receiver for block boundary detection. Even though the TS1 and TS2 ordered sets are similar, they provide a number of opportunities (e.g., in one such variant, four (4) opportunities) for the sync ordered set to be inserted during block alignment.

TABLE 6

| Symbol Number | Symbol | Description |
| --- | --- | --- |
| 0-3 | 1Eb | TS1 Identifier |
| 4-5 | 00h | Reserved |
| 6-13 | 1Eh | TS1 Identifier |
| 14 | 1Eh or DC balance Symbol | TS1 Identifier or DC Balance Symbol: 20h when 1s needs to be reduced DFh when 0s needs to be reduced |
| 15 | 1Eh or DC balance Symbol | TS1 Identifier or DC Balance Symbol: 08h when 1s needs to be reduced F7h when 0s needs to be reduced |

TABLE 7

| Symbol Number | Symbol | Description |
| --- | --- | --- |
| 0-3 | 2Db | TS2 Identifier |
| 4-5 | 00b | Reserved |
| 6-13 | 2Dh | TS2 Identifier |
| 14 | 2Dh or DC balance Symbol | TS2 Identifier or DC Balance Symbol: 20h when 1s needs to be reduced DFh when 0s needs to be reduced |

TABLE 7-continued

| Symbol Number | Symbol | Description |
|---|---|---|
| 15 | 2Dh or DC balance Symbol | TS2 Identifier or DC Balance Symbol: 08h when 1s needs to be reduced F7h when 0s needs to be reduced |

The RX camera interface 122 performs block alignment for all the lanes on the unidirectional main link 130 as well as performs scrambler synchronization and optionally completes the lane polarity detection and correction, based on the aforementioned TS1 and TS2 ordered sets. In embodiments that have more than one active lane in the unidirectional main link 130, the RX camera interface 122 performs inter-lane alignment using SYNC patterns. More directly, the SYNC ordered set control block is a unique pattern that the RX camera interface 122 can use to determine the location of the block headers in the received bit stream. The RX link controller (not shown) within the RX camera interface 122 could be in one of two phases during block alignment: (1) an unaligned phase (typically where the receiver has lost synchronization e.g., after a power event); or (2) an aligned phase.

During the unaligned phase (e.g., when the RX camera interface 122 exits a low-power link state), the RX camera interface 122 monitors the received bit stream over the unidirectional main link 130 for SYNC ordered set control blocks. When a SYNC ordered set is detected, the RX camera interface 122 adjusts its alignment to the received SYNC ordered set and proceeds to the aligned phase. Adjustments may be "hard" (i.e., a time counter is set to the SYNC ordered set), or "soft" (where the adjustment is corrected over time, or where the adjustment cannot exceed a maximum delta).

During the aligned phase, the RX camera interface 122 monitors the received bit stream over the unidirectional main link 130 for SYNC ordered sets. If a SYNC ordered set is detected with an alignment that does not match the current alignment, then responsively the RX camera interface 122 corrects its alignment to the newly received SYNC ordered set. When a Start of Data Stream (SDS) ordered set is received, the RX camera interface 122 proceeds to the Locked phase. An exemplary SDS ordered set is reproduced below in Table 8.

TABLE 8

| Symbol Number | Symbol | Description |
|---|---|---|
| 0-3 | E1H | SDS Identifier |
| 4-15 | 55H | SDS Ordered Set symbols |

During the locked phase, the RX camera interface 122 will not adjust its block alignment. In other words, data blocks are expected to be received with the determined alignment. If an undefined block header is received while in the locked phase, the LX camera interface 122 transitions back to either: (1) the unaligned phase; or (2) the aligned phase as discussed supra.

In the final phase of link training, the camera module 110 transitions into an Idle state and/or prepares for Active data transmission at the data rate that was link trained. In order to initiate Active data transmissions, the camera module transmits a predetermined number of SDS ordered sets (e.g., five (5), see Table 8 reproduced supra) followed by a predetermined number of Logical Idle symbols (e.g., sixteen (16)) and then transitions to transmitting live data (in so-called Mission mode) at the date rate that was link trained. The integrated circuit 120 receives the predetermined number of SDS ordered sets followed by the predetermined number of Logical Idle symbols and then also transitions to the so-called Mission mode at the data rate that was link trained. If the integrated circuit 120 does not successfully receive the predetermined number of SDS ordered sets and predetermined number of Logical Idle symbols prior to single bit error correction, the integrated circuit 120 will optionally recommence link training at a lower specified data rate. See Table 9 reproduced infra for exemplary timing requirements for time periods $T_{CAL}$, $T_{INIT}$, $T_{REXQ}$, $T_{CFG}$ and $T_{IDLE}$ referenced above.

TABLE 9

| Parameter | Min | Max | Units |
|---|---|---|---|
| $T_{CAL}$ | 550 | | µS |
| $T_{INIT}$ | 140 | | µS |
| $T_{REXQ}$ | | 3000 | µS |
| $T_{CFG}$ | | 17k | UI |
| $T_{IDLE}$ | | 2k | UI |
| $T_{ALPM\_W}$ | 100 | | µS |

Using the aforementioned link training methods, the TX camera interface 102 and RX camera interface 122 are able to dynamically adjust to a non-predetermined data rate over an unidirectional link. More directly, the dynamic adjustment may occur with minimal to no feedback occurring between the two ends (e.g., TX camera interface 102 and RX camera interface 122) of the unidirectional link and link training is based on configurable timers (e.g., time periods $T_{CAL}$, $T_{INIT}$, $T_{REXQ}$, $T_{CFG}$ and $T_{IDLE}$). In other words, the results from the link training are intelligently interpreted by the RX camera interface 122 without necessitating link feedback (i.e., as a result of the main link 130 being unidirectional in nature). Various embodiments of the present disclosure do not require sideband channel(s) (e.g., I²C bus 150) for link initialization and/or training, and can be used where sideband channels are too slow to provide meaningful feedback.

Packet Protocol—

In one exemplary embodiment, subsequent to main link 130 training, so-called Frame control packets (FCP) are used to signal the start of a line, end of a line, start of a frame or end of a frame, the start and end of camera stream attribute (CSA) packets, and the start and end of secondary data packets. Frame control packets may be transmitted over all of the active lanes on the main link 130. The FCP is a fixed length framing packet that begins with an FCP delimiter that is composed of four (4) symbol framing ordered sets, followed by three (3) bytes of FCP specific information, followed by 1 parity byte. The FCP specific bytes are, in one exemplary implementation, protected by a Reed Solomon (15, 13) error correction code. A four (4) symbol tail composed of end (END) and end packet framing (EPF) ordered sets mark the end of the FCP followed by the parity byte. An exemplary FCP packet structure is illustrated below in Table 10, while the FCP specific information (i.e., FCP Specific (3 Bytes) in Table 10) is illustrated in subsequent detail herein with regards to Table 11.

TABLE 10

Frame Control Packet (FCP)

| MSB | EPF | END | END | END | Parity Byte (1 B) | FCP Specific (3 Bytes) | EPF | SLC | SLC | SLC | LSB |
|---|---|---|---|---|---|---|---|---|---|---|---|

TABLE 11

| Byte Number | Bits | Value | Description |
|---|---|---|---|
| 1 | 3:0 | | FCP Type |
| | | 0000 | Reserved |
| | | 9h | Start of Frame |
| | | 6h | End of Frame |
| | | 3h | Start of Line |
| | | Ch | End of Line |
| | | 5h | Start of CSA1 |
| | | Dh | End of CSA1 |
| | | Ah | Start of CSA2 |
| | | Eh | End of CSA2 |
| | | Bh | Start of SDP |
| | | 2h | End of SDP |
| | | others | Reserved |
| | 7:4 | | Virtual Channel Number: Up to 16 Channels |
| 2 | 4:0 | | Index Ex: FCP sent to indicate Start or End of Frame, Index shall reflect Frame number in the Virtual Channel. FCP sent to indicate Start or End of Line, Index shall reflect Frame number in the Virtual Channel. FCP associated with SDP and CSA shall indicate Frame number in the Virtual Channel. Index shall always start with 0b and roll over once the counter has reached the maximum value. |
| | 7:5 | | Reserved (ALL zeros) |
| 3 | 7:0 | | Reserved (ALL zeros) |

Figure 4:
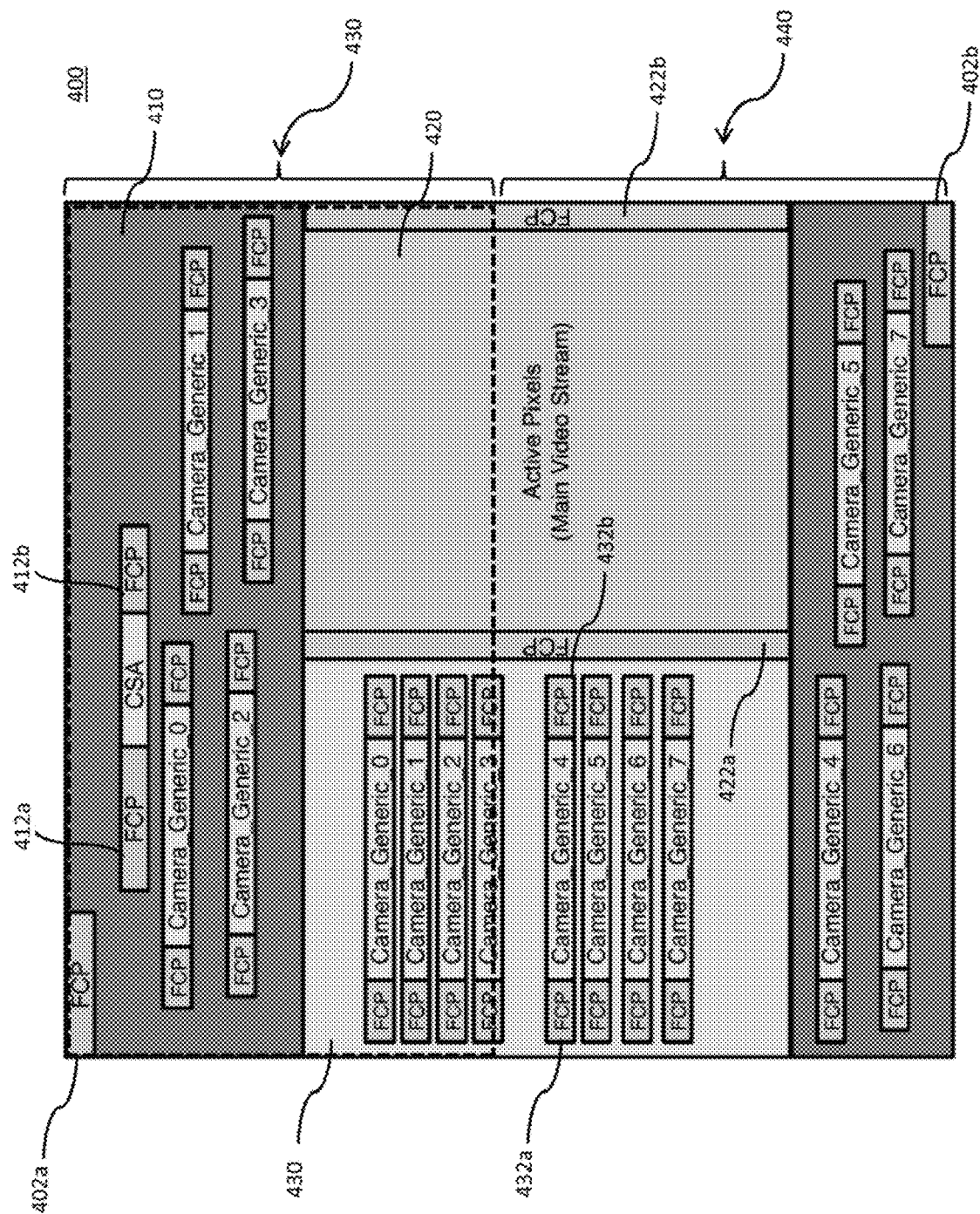
FIG. 4 is a schematic illustrating frame control packet transmission within a frame in accordance with the principles of the present disclosure.
Figure 5:
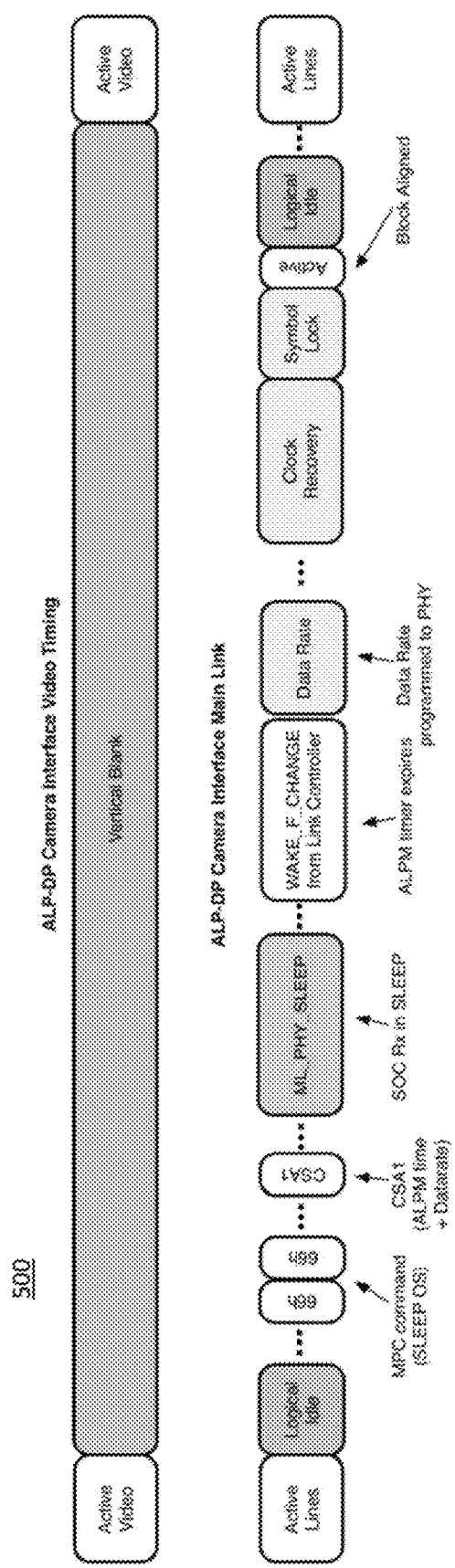
FIG. 5 is a schematic illustrating entry and exit sequences for entering low power modes of operation in accordance with the principles of the present disclosure.

FCPs are transmitted at several locations in the frame depending upon the type of information that is being framed. Referring now to FIG. 4, various possibilities of when FCPs can be transmitted within a given frame 400 are illustrated. For example, the start and end of a frame are framed by FCPs 402a, 402b with the FCP type set appropriately. For example, as depicted in Table 11 above, and in one exemplary implementation, bits [3:0] of FCP 402a will be set to 0x9 indicating a start of a frame, while bits [3:0] of FCP 402b will be set to 0x6 indicating the end of the frame.

Bits [7:4] reflect the virtual channel associated with the frame. Accordingly, as the bit field is four-bits long, up to sixteen (16) different virtual channels can be encoded into the FCP. As a brief aside, a stream generated by a particular sensor (e.g., sensor 106a) will be defined by a particular virtual channel. Accordingly, and in the exemplary embodiment illustrated in FIG. 1, 'n' virtual channels will be defined for each of the sensors 106a . . . 106n contained within camera interface system 100. In other words, by defining virtual channels the camera interface system 100 is able to support multiple camera sensors at once. Byte 2 in Table 11 depicted above (in particular, bits [4:0] of Byte 2) reflects the index value corresponding to the frame number within a given virtual channel. Index values will start off at a bit value of 0 b and will roll over once the counter has reached the maximum value as defined by the number of bits (e.g., bits [4:0]) for this particular field.

Referring again to FIG. 4, FCPs 412a, 412b will be utilized to frame CSA packets at both the start and end of the CSA packet. For example, bits [3:0] will have a value of 5 h and Dh for the start 412a and end 412b of the CSA packet, respectively, in one exemplary embodiment. The virtual channel number and index fields will be populated with valid values to allow the RX camera interface 122 to distinguish the CSA packets corresponding to different frames in different virtual channels. FCPs 432a, 432b are used to frame camera secondary data packets, while FCPs 422a, 422b frame the active pixels 420 within a given frame 400. Note that as illustrated in FIG. 4, the secondary data packets are shown within various portions of the frame 400 including during vertical blanking intervals 410 and horizontal blanking intervals 430. Note also that the secondary data packets in the illustrated embodiment are not transmitted during the active pixel stream 420.

Accordingly, herein lies a salient advantage for the use of FCP packets within camera interface system 100. Namely, the use of FCP packets allows the camera interface system 100 to transfer data according to loosened boundaries in order to, inter alia, enter power saving modes by, for example, transferring active pixel data during blanking periods and flexibly transferring secondary data packets within various portions of interval periods 410 and 430. In other words, the use of FCP packets enables the transmission of data in earlier (or later) periods within a frame 400, thereby enabling the camera interface system 100 to maximize lower power saving mode. For example, by transmitting all of the CSA and secondary packets consecutively, the active transmission time for frame 400 can be limited to an actively powered area 430; thereafter, the camera interface system 100 can enter a lower powered state for the remainder of the frame 440. In this manner, the use of FCP packets remove and/or reduce isochronous time constraints on, for example, the display data delivery. Various other packet protocol related information is depicted in Appendix A, which also forms a portion of the present disclosure.

Example Operation, Low Power Operation—

As a brief aside, power consumption is a significant consideration for most consumer electronics devices. Longer battery life is a tangible benefit that many customers can immediately perceive and which significantly contributes to the commercial success of consumer electronics. At the same time, high performance operation requires higher processing performance, more processing operations, and faster processing operation, all of which greatly increase power consumption.

In order to reduce power consumption, various aspects of the present disclosure are directed to minimizing the amount of operational overhead associated with high performance operation. In particular, embodiments of the present disclosure allow a high speed bus interface to optimize its power consumption by shortening link training and/or simplifying the link training process. In one exemplary embodiment, a device that includes an internal source component (e.g., one or more cameras) receives a power on command from the sink (e.g., one or more applications processors). Thereafter, the source and sink proceed to train the link. If the link is successfully trained, then the source can begin a data transmission and/or transition to an idle mode (which consumes less power than active data transmissions). When the link is inactive for an extended period of time, the link can transition into a low power mode (which further reduces power consumption). Unfortunately, overzealous attempts to operate in low power mode can result in loss of link training data (e.g., since the link calibration data is stored in unpowered memories and/or processing logic), which requires re-calibration and increases operational overhead.

In one exemplary embodiment, once the device has successfully initialized, the device will attempt to complete the data transmissions immediately so as to transition to low power operation as quickly as possible. More directly, under low power operation, the device aggressively turns off processing logic when not needed, to save as much power as possible. As noted previously, the link trained state is typically lost when the component is powered down; thus, in one variant, the source and sink components cache a portion (if not all) of the link training information. In other words, the source and sink components cache as much link training information as possible to facilitate subsequent link training (e.g., when exiting the low power mode, etc.). By caching the link training information, the link can be recovered in a shorter amount of time than performing link training from existing "cold" power on link training sequences (i.e., where the link training information has not been pre-cached). In one such exemplary variant, the link training information allows the source and sink to skip over significant portions of the link training sequence. For example, in one such implementation, receiver equalization training is an order of magnitude longer than the other portions of link training; thus, implementations that cache the state of the equalizer and can wake-up with the cached state will have significant power savings.

Artisans of ordinary skill in the related arts will readily appreciate that the various principles described herein may be substituted with equivalent success in a variety of other power management sequences (e.g., cold boot, other power modes, etc.), given the contents of the present disclosure. For example, similar improvements can be made to "cold" boot link initialization; in one exemplary embodiment of the present disclosure, once the source and sink have successfully trained the link, the link training information can be cached prior to powering down. During subsequent cold boot initializations, the link training process can be abridged to reflect the pre-cached link state.

Additionally, it should be noted that while the various described principles greatly improve link initialization processes, some aspects of link training cannot be skipped or optimized out. Thus, some embodiments may further enforce a minimum amount of time that the link must stay in the low power state. In one such variant, the minimum amount of time is selected based on the length of time of link training that cannot be optimized out and/or relative metrics for the overhead of link training. Thus, the minimum amount of time ensures that performance savings from reduced link training are not offset by excessively aggressive "churn" (processing overhead associated with e.g., power state changes, etc.). Software designers and/or embedded algorithms can balance the relative costs and benefits of low power operation based on the minimum amount of time; where the cost is not worth the benefit the components can remain in the "idle state". During such operation, once the minimum amount of time has been satisfied, the link can be reinitialized at a preset time or asynchronously depending on higher level instructions (e.g., due to user activity such as pressing a camera button, etc.).

Methods—

Figure 6:
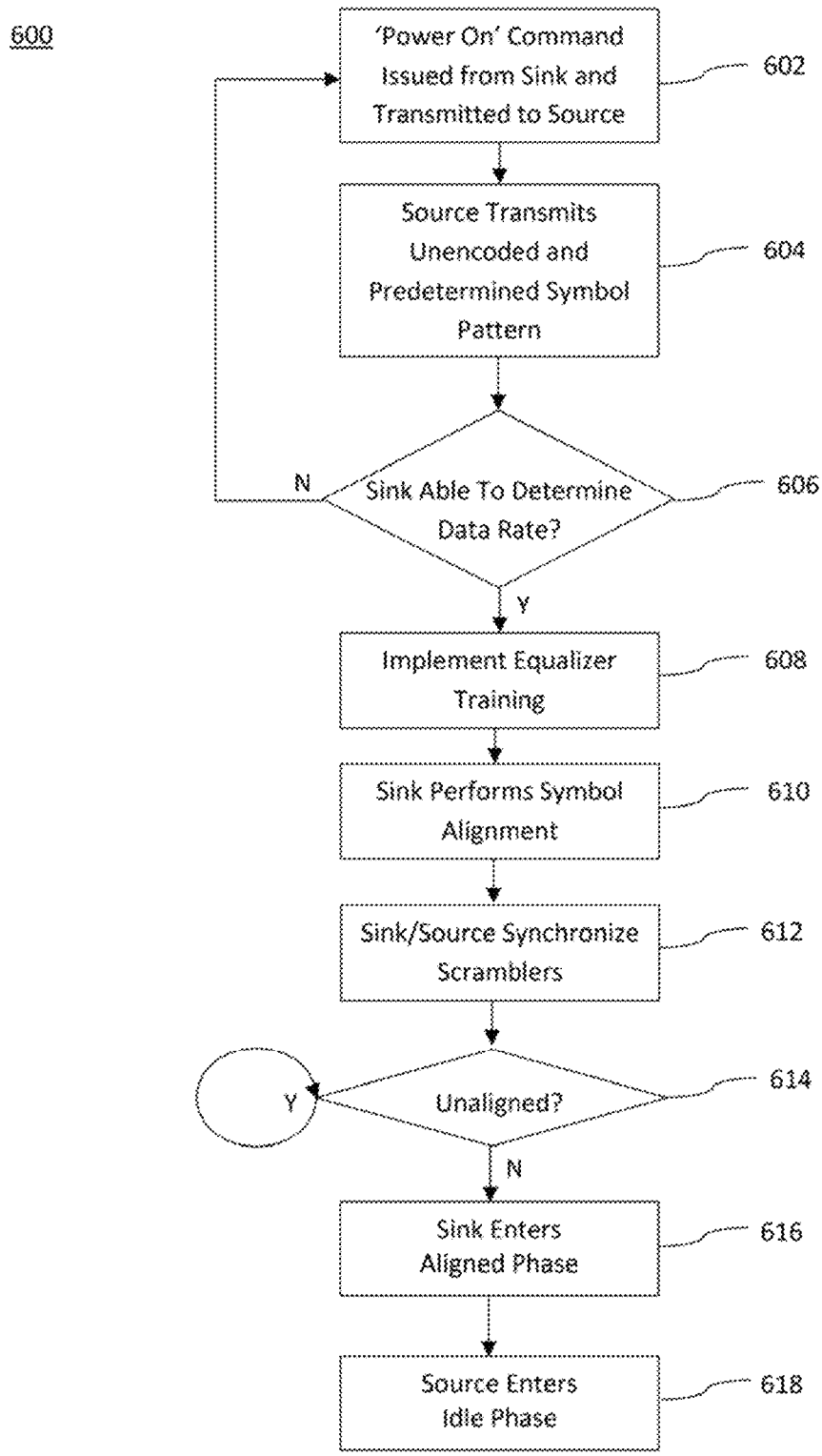
FIG. 6 is a logical flow diagram illustrating a generalized method for link training a unidirectional link in accordance with the principles of the present disclosure.

Referring now to FIG. 6, a generalized method 600 for link training a unidirectional link (such as the unidirectional multi-lane main link as shown in FIG. 1), is shown and described in detail. At step 602, a sink will issue a power on command and transmit the command to a source. The power on command is transmitted over a bi-directional auxiliary link, as the main link is unidirectional (i.e., data is not transmitted from sink to source over the main link).

At step 604, the source receives the power on command from the sink. Upon receipt of the power on command, the source begins repeated transmission of a test pattern at one or more data rates. In one exemplary embodiment, the test pattern is an un-encoded predetermined symbol pattern(s). In one such variant, the un-encoded predetermined symbol pattern(s) are transmitted for a pre-specified period of time.

At step 606, the sink determines whether or not it is able to determine one or more data rates for the unidirectional link based on receipt of the test pattern. If the sink is unable to receive the test pattern at any data rate, then the method 600 transitions back towards step 602 where the sink issues a subsequent power on command. If however, the sink is able to determine one or more suitable data rates for the unidirectional link, method 600 transitions to step 608. The transition from step 606 to step 608 occurs only in the absence of a subsequent power on command, automatically after a pre-specified period of time. In other words, the transition from step 606 to 608 requires an uninterrupted and successful initialization sequence.

At step 608, the source and sink implement equalizer training. During equalizer training, the source transmits an ordered set of symbols on all active lines of the main link for a predetermined period of time. The sink receives these ordered sets and performs receiver equalization on the incoming ordered set of symbols received from the source at step 610.

At step 612, the source and the sink synchronize their respective scramblers in order to ensure that scrambled symbols received from the source can be properly unscrambled and interpreted at the sink.

At step 614, the sink periodically determines whether or not the received symbols from the source are unaligned. In one exemplary embodiment, the sink detects a predetermined ordered set transmitted from the source and adjusts its alignment accordingly, before entering the aligned phase at step 616.

At step 618, the sink determines that link training has been completed over the unidirectional main link and the source enters an idle phase and/or active transmissions phase. Note again, that the behavior of the source and sink occurs without feedback communication being transmitted from the sink. At this point, the source is able to transmit data (e.g., A/V data generated by a camera sensor) to the sink for subsequent processing.

Figure 7:
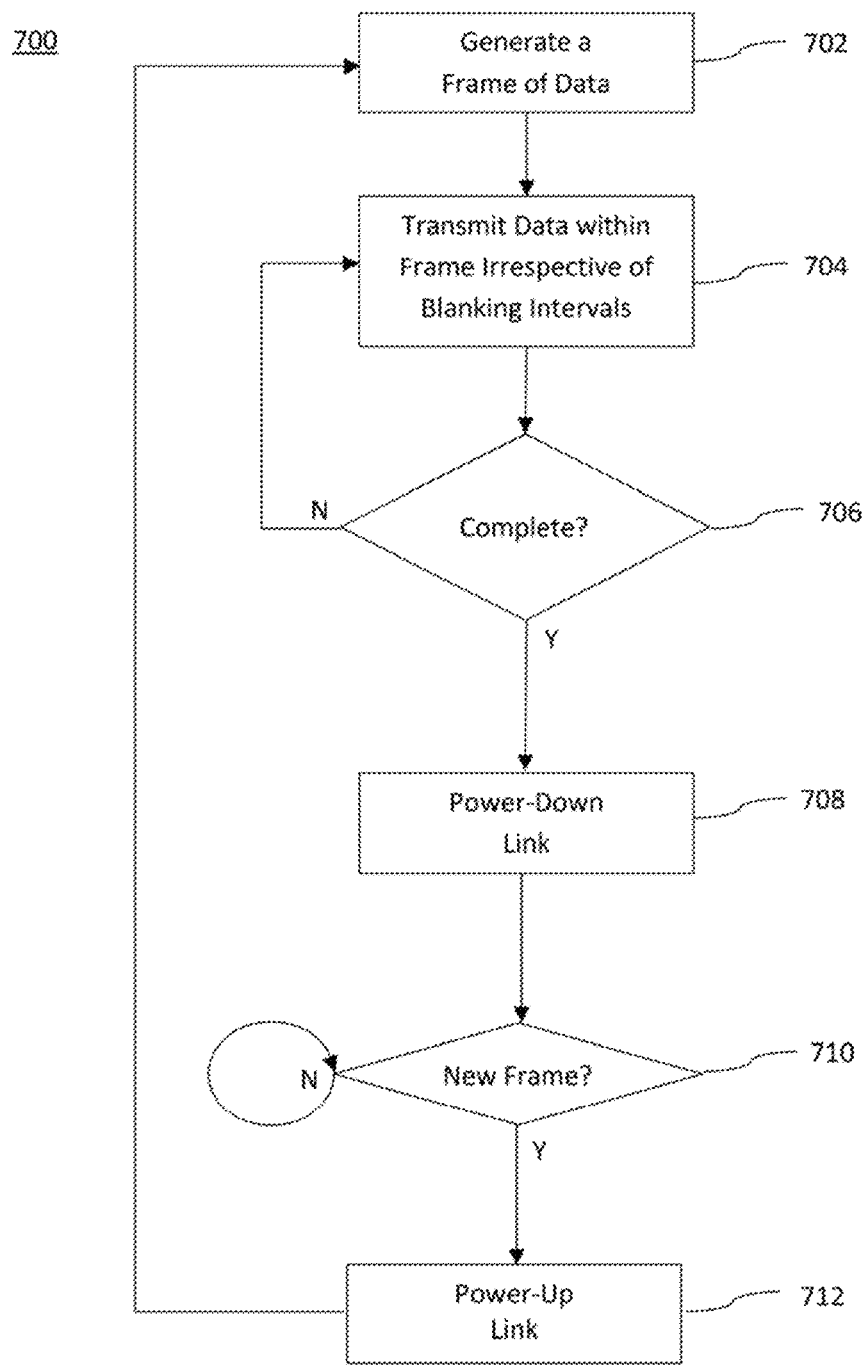
FIG. 7 is a logical flow diagram illustrating a generalized method for powering down a unidirectional link in accordance with the principles of the present disclosure.

FIG. 7 is a logical flow diagram illustrating a generalized method 700 for powering down a unidirectional link, such as unidirectional multi-lane link 130 illustrated in FIG. 1.

At step 702, the source generates a frame of data for transmission to the sink. Note that in one or more exemplary implementations, method 700 will only begin subsequent to the link training methodology as discussed above with regards to FIG. 6.

At step 704, a source transmits frame data towards a sink irrespective of blanking intervals (e.g., horizontal and vertical blanking intervals). In exemplary embodiments, this transmission irrespective of blanking intervals can occur as a result of the framing of each of the individual packets within the frame of data to be transmitted.

At step 706, the source determines whether or not the transmission of the entire frame of data has been completed. If it has not, the transmission of data continues on at step 704, otherwise at step 708, the source issues a command to the sink to enter a powered down state.

At step 710, the source determines if it has a new frame of data to transmit towards the sink, the source will transmit a power up command to the sink at step 712. In some cases, the source and sink must repeat the link training methodology 600 of FIG. 6 prior to generating the new frame of data for transmission. In alternative variants, the source will immediately transition towards generating a subsequent frame of data to transmit to the sink.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for conserving power in a link of an image data interface system, the image data interface system comprising a data link configured for data communication between a source and a sink, the method comprising:
    inserting respective frame control packets around each of a plurality of sets of one or more data packets, the respective frame control packets signaling a start and an end of a corresponding set of one or more data packets, the respective frame control packets enabling transmission of the corresponding set of one or more data packets during a blanking interval; and
    transitioning the data link to a lower power state based at least on transmission of the plurality of sets of one or more data packets to the sink during the blanking interval.

2. The method of claim 1, further comprising:
    prior to the transmission of the plurality of sets of one or more data packets, implementing a link training protocol for the data link; and
    wherein the implementing the link training protocol comprises:
        responsive to receiving a link power-on command, transmitting one or more link training data from the source to the sink via the data link, the one or more link training data enabling data transactions via the data link.

3. The method of claim 2, wherein the data link comprises a unidirectional data link.

4. The method of claim 3, further comprising:
    responsive to the transitioning of the unidirectional link to the lower power state, caching at least a portion of the one or more link training data; and
    transitioning the unidirectional link from the lower power state to a powered-down state subsequent to the caching.

5. The method of claim 4, further comprising repeating, subsequent to said transitioning to the powered-down state, the link training protocol at least once using at least the cached portion of the one or more link training data.

6. The method of claim 1, further comprising inserting second respective frame control packets around one or more active pixel areas, the inserting of the second respective frame control packets enabling transmission of the one or more active pixel areas during the blanking interval.

7. The method of claim 1, wherein the transitioning the data link to the lower power state comprises:
    determining that no more data is available for transmission from the source to the sink; and
    based at least on the determining, transitioning the data link to the lower power state.

8. The method of claim 1, wherein:
    the data link comprises a unidirectional data link;
    the source comprises a camera device comprising one or more image sensors, and the one or more data packets comprise imaging data obtained from the one or more sensors; and
    the sink comprises a computerized device configured for processing of the imaging data.

9. A non-transitory computer-readable medium having computer-readable instructions stored thereon, the computer-readable instructions being configured to, when executed by one or more processors of a computerized source device, cause the computerized source device to:
    generate a frame of data for transmission, the frame of data comprising a plurality of data packets;
    frame the plurality of data packets with corresponding frame control packets, the corresponding frame control packets each signaling a start and an end of respective ones of the plurality of data packets;
    transmit, via a unidirectional link and within one or more blanking intervals, the plurality of data packets to a sink device; and
    transition the unidirectional link to a lower power state after the transmission of the one or more data packets during the blanking interval.

10. The non-transitory computer-readable medium of claim 9, wherein the one or more data packets comprises either an active pixel data stream or secondary camera data.

11. The non-transitory computer-readable medium of claim 9, wherein the computer-readable instructions are further configured to, when executed by the one or more processors, cause the computerized source device to:
    prior to the generation of the frame of data, receive a power-on command;
    in response to the power-on command, train the unidirectional link.

12. The non-transitory computer-readable medium of claim 11, wherein the training of the unidirectional link comprises transmission of link training data from the computerized source device to the sink device.

13. The non-transitory computer-readable medium of claim 11, wherein the training of the unidirectional link comprises transmission of one or more predetermined symbol patterns for a predetermined period of time from the computerized source device to the sink device.

14. The non-transitory computer-readable medium of claim 9, wherein the computer-readable instructions are further configured to, when executed by the one or more processors, cause the computerized source device to:
- determine that transmission of the frame of data has been completed in its entirety; and
- based at least on the determination that the transmission of the frame of data has been completed in its entirety, issue a command to the sink device to enter a powered-down state.

15. The non-transitory computer-readable medium of claim 14, wherein the computer-readable instructions are further configured to, when executed by the one or more processors, cause the computerized source device to:
- generate a new frame of data for transmission to the sink device; and
- based at least on the generation of the new frame of data, transmit a power-up command to the sink device.

16. An integrated circuit apparatus in data communication with an imaging device module via a unidirectional main link and a bidirectional auxiliary link, the integrated circuit apparatus comprising:
- an imaging device interface in communication with the unidirectional main link and the bidirectional auxiliary link; and
- a non-transitory computer-readable apparatus comprising a storage medium, the storage medium having instructions stored thereon, the instructions being configured to, when executed by a processor apparatus, cause the integrated circuit apparatus to:
    - issue a power-on command to the imaging device module via the bidirectional auxiliary link;
    - initiate training of the unidirectional main link;
    - receive one or more data packets via the unidirectional main link during one or more of a horizontal blanking period or a vertical blanking period, the one or more data packets encapsulated by respective frame control packets; and
    - subsequent to the receipt of the one or more data packets, transition to a powered-down state.

17. The integrated circuit of claim 16, wherein the respective frame control packets comprise first and second data configured to respectively indicate a start and an end of corresponding ones of the one or more data packets.

18. The integrated circuit of claim 16, wherein the instructions are further configured to, when executed by the processor apparatus, cause the integrated circuit to:
- receive test pattern data;
- based at least on a determination that one or more data rates for the unidirectional main link cannot be determined based on the receipt of the test pattern data, issue a power-on command to the imaging device module via the bidirectional auxiliary link; or
- based at least on a determination that the one or more data rates can be determined, cause implementation of equalization training of the unidirectional main link.

19. The integrated circuit of claim 18, wherein the test pattern data comprises one or more predetermined symbol patterns transmitted for a predetermined period of time, the implementation of equalization training occurring subsequent to the predetermined period of time.

20. The integrated circuit of claim 19, wherein:
- the integrated circuit apparatus comprises the processor apparatus; and
- the instructions are further configured to, when executed by the processor apparatus, cause the integrated circuit apparatus to periodically determine whether the received one or more predetermined symbol patterns are aligned with respect to a plurality of lanes of the unidirectional main link.

* * * * *